US012717637B2

(12) United States Patent
Choi et al.

(10) Patent No.: US 12,717,637 B2
(45) Date of Patent: Aug. 25, 2026

(54) ALLOCATING CORES TO EMPTY PROGRAMMING ENGINES USING A MEMORY ACCESS DEVICE

(71) Applicant: XCENA Inc., Seongnam-si (KR)

(72) Inventors: Ji Hun Choi, Yongin-si (KR); Do Hun Kim, Yongin-si (KR)

(73) Assignee: XCENA Inc., Seongnam-si (KR)

( * ) Notice: Subject to any disclaimer, the term of this patent is extended or adjusted under 35 U.S.C. 154(b) by 1 day.

(21) Appl. No.: 18/585,527

(22) Filed: Feb. 23, 2024

(65) Prior Publication Data

US 2025/0013501 A1 Jan. 9, 2025

(30) Foreign Application Priority Data

Jul. 5, 2023 (KR) ........................ 10-2023-0086990

(51) Int. Cl.
*G06F 9/50* (2006.01)
*G06F 13/16* (2006.01)

(52) U.S. Cl.
CPC .......... *G06F 9/5044* (2013.01); *G06F 9/5022* (2013.01); *G06F 13/1668* (2013.01)

(58) Field of Classification Search
CPC .. G06F 9/5044; G06F 9/5022; G06F 13/1668; G06F 9/5066; G06F 13/28
USPC .......................................................... 718/104
See application file for complete search history.

(56) References Cited

U.S. PATENT DOCUMENTS 7,685,354 B1 * 3/2010 Hetherington ...... G06F 12/0846 711/3
7,912,997 B1 * 3/2011 Murray ................... G06F 13/28 713/400
8,135,878 B1 * 3/2012 Jain ......................... G06F 13/28 710/25

(Continued)

FOREIGN PATENT DOCUMENTS

KR 10-2016-0087224 A 7/2016
KR 10-2016-0096279 A 8/2016

(Continued)

OTHER PUBLICATIONS

Korean Office Action of No. 10-2023-0086990 dated Aug. 29, 2023.
Korean Decision on Registration of No. 10-2023-0086990 dated Dec. 6, 2023.

*Primary Examiner* — Aimee Li
*Assistant Examiner* — Hsing Chun Lin
(74) *Attorney, Agent, or Firm* — Sughrue Mion, PLLC

(57) ABSTRACT

As one aspect of the present disclosure, a memory access device is disclosed. The device comprises: a command manager configured to receive and manage one or more commands from a plurality of cores; a programming engine unit comprising one or more programming engines configured to perform calculations in response to the one or more commands; and a direct memory access (DMA) controller configured to perform at least one of read access and write access to a memory external to the memory access device in response to the one or more commands, wherein the command manager comprises a command memory configured to store the one or more commands, and a slot management unit configured to allocate one or more cores that correspond to the one or more commands, respectively, to the one or more programming engines in sequence.

15 Claims, 4 Drawing Sheets

(56) References Cited

U.S. PATENT DOCUMENTS

| | | | | |
|---|---|---|---|---|
| 2005/0188119 | A1 * | 8/2005 | Hayden | G06F 13/28 710/22 |
| 2005/0289253 | A1 * | 12/2005 | Edirisooriya | G06F 13/28 710/22 |
| 2008/0071996 | A1 * | 3/2008 | Ohmori | G06F 13/4022 711/148 |
| 2008/0267066 | A1 * | 10/2008 | Archer | G06F 13/28 370/235 |
| 2009/0150575 | A1 * | 6/2009 | Madruga | G06F 13/28 710/25 |
| 2009/0150576 | A1 * | 6/2009 | Madruga | G06F 13/28 710/28 |
| 2016/0098306 | A1 * | 4/2016 | Chang | G06F 9/546 719/314 |
| 2017/0332028 | A1 * | 11/2017 | Uekusa | H04N 1/21 |
| 2023/0132931 | A1 * | 5/2023 | Greathouse | G06F 3/0679 711/154 |

FOREIGN PATENT DOCUMENTS

| | | | |
|---|---|---|---|
| KR | 10-2020-0114149 | A | 10/2020 |
| KR | 10-2022-0023598 | A | 3/2022 |
| KR | 10-2022-0048303 | A | 4/2022 |
| KR | 10-2022-0049842 | A | 4/2022 |
| KR | 10-2022-0067795 | A | 5/2022 |
| KR | 10-2022-0114449 | A | 8/2022 |
| KR | 10-2023-0090259 | A | 6/2023 |

* cited by examiner

ALLOCATING CORES TO EMPTY PROGRAMMING ENGINES USING A MEMORY ACCESS DEVICE

CROSS-REFERENCE TO RELATED APPLICATION

This application claims priority under 35 U.S.C § 119 to Korean Patent Application No. 10-2023-0086990 filed on Jul. 5, 2023, in the Korean Intellectual Property Office, the entire contents of which are hereby incorporated by reference.

TECHNICAL FIELD

The present disclosure relates to a memory access device and a method for allocating cores to programming engines using the same.

BACKGROUND

Direct memory access (DMA) is an input/output control method that allows cores (e.g., CPUs) to be excluded in data input/output processes by directly accessing memory, and can be implemented by a DMA controller.

A programming engine (PE) may be a hardware controller that has its own internal memory and pipeline structure, and may be for efficiently performing dynamic programming such as the Burrows Wheeler Aligner (BWA) algorithm. As one example, since the result values of previously performed calculations are used again in dynamic programming, such result values can be stored in the internal memory that the programming engine has on its own and may then be used for calculations when necessary.

A multifunction direct memory access (Multifunction DMA: MDMA) controller has programming engines (PEs) placed inside the DMA controller described above, and can utilize them efficiently for calculations such as dynamic programming by enabling input/output to the internal memory of the programming engines (PEs) with only DMA read access or DMA write access.

However, in such an MDMA controller, since, previously, there were as many programming engines (PEs) as there were cores and each core was designed to have a corresponding programming engine (PE), a situation occurred in which the programming engines would remain idle when cores were not performing calculations that required the programming engines, resulting in a problem of wasting resources.

SUMMARY

Therefore, it is one object of the present disclosure to provide a method for maximizing resource utilization by minimizing idle time of programming engines by effectively allocating cores to programming engines without having to match cores to programming engines in 1:1.

However, the objects to be achieved by the present disclosure are not limited to those mentioned above, and may include objects that have not been mentioned but can be clearly understood by those of ordinary skill in the art to which the present disclosure pertains from the description below.

The present disclosure may be implemented in a variety of ways, including devices, systems, methods, or computer programs stored on a readable storage medium.

A memory access device in accordance with one embodiment of the present disclosure comprises: a command manager configured to receive and manage one or more commands from a plurality of cores; a programming engine unit comprising one or more programming engines configured to perform calculations in response to the one or more commands; and a direct memory access (DMA) controller configured to perform at least one of read access and write access to a memory external to the memory access device in response to the one or more commands, wherein the command manager comprises: a command memory configured to store the one or more commands; and a slot management unit configured to identify a core having a command that is currently pending and is not being executed by programming engines out of one or more cores that correspond to the one or more commands, respectively, and allocate the identified core to a programming engine that is empty as no cores are currently allocated thereto out of the one or more programming engines.

In one embodiment, wherein the slot management unit comprises a first bitmap configured to identify cores on which commands are currently pending and a second bitmap configured to identify cores on which commands are being executed by programming engines, and the slot management unit identifies the core having commands that are currently pending and are not being executed by the programming engines based on the first bitmap and the second bitmap.

In one embodiment, wherein the slot management unit is set to enable bits corresponding to cores on which commands are currently pending in the first bitmap, and disable bits corresponding to cores on which commands are currently being executed in the second bitmap.

In one embodiment, wherein the slot management unit allocates the identified core to a programming engine that is empty as no cores are currently allocated thereto.

In one embodiment, wherein allocating the identified core to a programming engine that is empty as no cores are currently allocated thereto is performed in sequence by a round-robin arbiter of the command manager.

In one embodiment, wherein the slot management unit stores in mapping information a mapping relationship indicating that the identified core has been allocated to the programming engine, and the slot management unit transmits commands to programming engines based on the mapping information.

In one embodiment, wherein the number of the one or more programming engines in the programming engine unit is less than the number of the plurality of cores.

In one embodiment, wherein a programming engine that has been allocated a first core of the plurality of cores performs calculations based on a command corresponding to the first core.

In one embodiment, wherein the programming engine, which has completed the calculations based on the command corresponding to the first core, issues and transmits a deallocation signal to the slot management unit.

In one embodiment, wherein the programming engine, which has completed calculations based on a command corresponding to a first core of the plurality of cores, issues and transmits a deallocation signal to the slot management unit, and the slot management unit disables a bit in the second bitmap corresponding to the core in response to receiving the deallocation signal.

In one embodiment, wherein a completion signal indicating that the calculations based on the command corresponding to the first core have all been completed is transmitted to the slot management unit, and the completion signal is transmitted by WDMA (write direct memory access) after confirming that a last calculation of the programming engine based on the command has been completed.

A method for allocating cores to programming engines in accordance with one embodiment of the present disclosure, wherein the method is performed by a memory access device, the method comprises the steps of: receiving and storing one or more commands from a plurality of cores, wherein each command corresponds to a core, respectively; identifying a core having a command that is currently pending and is not being executed by programming engines; and allocating the identified core to a programming engine that is empty as no cores are currently allocated thereto out of one or more programming engines included in a programming engine unit.

In one embodiment, wherein the step of allocating the identified core to a programming engine that is empty as no cores are currently allocated thereto out of the one or more programming engines comprises a step of allocating the identified core to the programming engine based on a first bitmap configured to identify cores on which commands are currently pending and a second bitmap configured to identify cores on which commands are being executed by programming engines.

In one embodiment, the method further comprising the steps of: storing in mapping information a mapping relationship indicating that the identified core has been allocated to the programming engine; and transmitting commands to programming engines based on the mapping information.

In one embodiment, wherein the number of the one or more programming engines in the programming engine unit is less than the number of the plurality of cores.

In one embodiment, the method further comprising the steps of: performing calculations based on a command corresponding to a first core by a programming engine that has been allocated the first core of the plurality of cores; and issuing a deallocation signal by the programming engine that has completed the calculations based on the command corresponding to the first core.

In one embodiment, the method further comprising the steps of: issuing a deallocation signal by a programming engine that has completed calculations based on a command corresponding to a first core of the plurality of cores; and disabling a bit in the second bitmap corresponding to the core in response to the deallocation signal.

In one embodiment, the method further comprising the step of: transmitting a completion signal indicating that the calculations based on the command corresponding to the first core have all been completed, wherein the completion signal is transmitted after confirming that a last calculation of the programming engine based on the command has been completed.

As one aspect of the present disclosure, a computer-readable recording medium comprising computer-executable instructions is disclosed. The instructions, when executed by a processor, cause the processor to perform a method for allocating cores to programming engines, the method comprising: receiving and storing one or more commands from a plurality of cores, wherein each command corresponds to a core, respectively; identifying a core having a command that is currently pending and is not being executed by programming engines; and allocating the identified core to a programming engine that is empty as no cores are currently allocated thereto out of one or more programming engines.

As described above, the present disclosure has the following effects.

According to various embodiments of the present disclosure, there arise effects that the number of programming engines (PEs) can be designed to be less than the number of cores by minimizing the idle time of the programming engines (PEs) and that hardware resources such as SRAM utilized for designing the programming engines can be saved, by employing a method in which the memory access device includes a slot management unit within the command manager and this slot management unit allocates (i.e., maps) each core to a programming engine (PE).

The effects of the present disclosure are not limited to those mentioned above, and other effects that have not been mentioned will be clearly understood by those having ordinary skill in the art to which the present disclosure pertains (hereinafter referred to as a 'person of ordinary skill') from the description of the claims.

BRIEF DESCRIPTION OF THE DRAWINGS

As the following drawings accompanying the present specification illustrate preferred embodiments of the present disclosure and serve to help further understand the technical idea of the present disclosure together with the detailed description of the present disclosure, the present disclosure should not be construed as being limited to those described in such drawings.

DETAILED DESCRIPTION OF THE PREFERRED EMBODIMENTS

Figure 1:
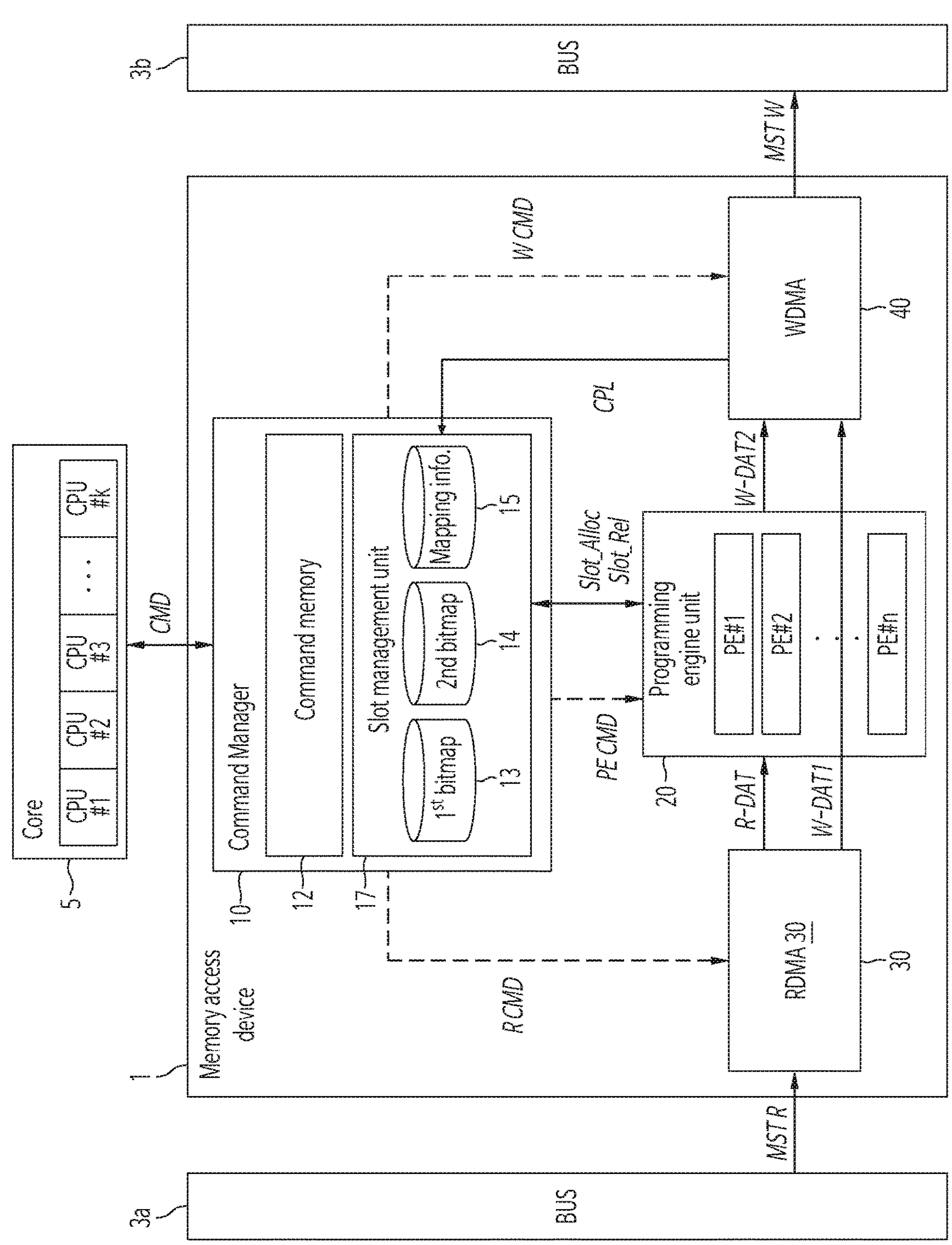
FIG. 1 is a block diagram conceptually illustrating an architecture included in a memory access device in accordance with one embodiment of the present disclosure.

The various embodiments described herein are illustrated for the purpose of clearly describing the technical idea of the present disclosure, and are not intended to limit it to particular embodiments. The technical idea of the present disclosure includes various modifications, equivalents, and alternatives of each embodiment described herein, and embodiments obtained by selectively combining all or part of each embodiment. In addition, the scope of the technical ideas of the present disclosure is not limited to the various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

Basic Architecture of Memory Access Device

FIG. 1 is a block diagram conceptually illustrating an architecture included in a memory access device in accordance with one embodiment of the present disclosure.

Referring to FIG. 1, a memory access device 1 in accordance with one embodiment of the present disclosure may include a command manager 10 for receiving, storing, and managing one or more commands CMD from a plurality of cores 5, a programming engine unit 20 including one or more programming engines PE #1, PE #2, . . . , and PE #n for performing calculations in response to the one or more commands CMD, and DMA controllers 30 and 40 for performing at least one of read access MST R and write access MST W to a memory external to the memory access device 1 via a system bus 3*a* in response to the one or more commands CMD. The DMA controllers 30 and 40 may include RDMA (read direct memory access) 30 for the read access MST R to the memory external to the memory access device 1 via the system bus 3*a*, and WDMA (write direct memory access) 40 for the write access MST W to the memory external to the memory access device 1 via the system bus 3*b*, in response to the one or more commands CMD.

According to one embodiment, the memory access device 1 may be a multifunction DMA (MDMA) controller. The MDMA controller may not only function to perform memory input/output (i.e., read and write) by excluding the cores 5 and directly accessing the memory like typical DMA controllers, but also function to perform tasks that require an internal memory and calculations on their own, such as dynamic programming, by including the programming engine unit 20.

In other words, the commands CMD that the memory access device 1 receives from the cores 5 may be at least one of those related to simple memory input/output (R CMD and W CMD), or those involving not only memory input/output but also calculations by the programming engine unit 20 in the memory access device 1 (PE CMD). In the former case, the memory access device 1 may function as a typical DMA controller, the RDMA 30 may transfer the data read from an external memory via the read access MST R to the WDMA 40 (W-DAT1), and the WDMA 40 may write the data to another external memory via the write access MST W. In the latter case, the RDMA 30 of the memory access device 1 may transfer the data read from an external memory via the read access MST R to at least one programming engine of the programming engine unit 20 (R-DAT), the programming engine may perform calculations using the received data and then transfer the result data to the WDMA 40 (W-DAT2), and the WDMA 40 may write the received result data to another external memory via the write access MST W. However, the commands CMD may consist of multiple sub-commands, and there may be a case where each sub-command requires only memory input/output (i.e., the former case) or a case involving calculations by the programming engines (i.e., the latter case).

Meanwhile, the core 5 may be used in the same sense as a processor as a logical circuit for processing instructions of a computing system, and the core 5 may be, for example, one or more CPUs (central processing units). Further, the core 5 may be a multi-core consisting of a plurality of cores CPU #1, CPU #2, CPU #3, . . . , and CPU #k, and each core may issue commands CMD to the memory access device 1. As such, since the memory access device 1 can receive a plurality of commands from the plurality of cores CPU #1, CPU #2, CPU #3, . . . , and CPU #k, the memory access device 1 may include a command manager 10 for managing these commands. The specific configuration of the command manager 10 will be described in more detail later.

Each of the one or more programming engines included in the programming engine unit 20 may be a hardware module having its own internal memory and pipeline structure, and may be to efficiently perform dynamic programming such as the Burrows Wheeler Aligner (BWA) algorithm. As one example, since the result values of previously performed calculations are used again in dynamic programming, such result values can be stored in the internal memory that the programming engine has on its own and may then be used for calculations when necessary.

The read access MST R and the write access MST W to the external memory can be done via the system buses 3*a* and 3*b*. The system buses 3*a* and 3*b* refer to standardized paths through which data can be transmitted and received mutually between the cores 5 and the memory access device 1, between the cores 5 and the input/output ports, or the like, and may be data buses, for example. In the present disclosure, data transmission and reception can be done via the system buses between the cores 5 and the memory access device 1, between the memory access device 1 and the external memory (not shown), and the like.

Configuration of Command Manager

Referring to FIG. 1, the memory access device 1 in accordance with one embodiment of the present disclosure includes the command manager 10 for managing the plurality of commands from the plurality of cores CPU #1, CPU #2, CPU #3, . . . , and CPU #k, and the command manager 10 may include a command memory 12 for storing the commands, and a slot management unit 17 for monitoring whether one or more programming engines PE #1, PE #2, and PE #n of the programming engine unit 20 are currently in use and assigning commands to programming engine that are not currently in use.

The slot management unit 17 may include a first bitmap 13 for identifying the cores on which commands are currently pending (i.e., the commands are waiting for execution or are currently being executed), and a second bitmap 14 for identifying the cores on which commands are currently being executed. The first bitmap 13 may be referred to as a valid bitmap in that it identifies currently pending valid commands, and the second bitmap 14 may be referred to as a run bitmap in that it identifies the cores having the commands that are currently being executed.

Meanwhile, although the example of FIG. 1 discloses that the first bitmap 13, the second bitmap 14, and mapping information 15 are included in the slot management unit 17, the first bitmap 13, the second bitmap 14, and the mapping information 15 may also be located outside the slot management unit 17 or even outside the command manager 10, the slot management unit itself may be implemented as a separate module distinct from the command manager, but there are no limitations on these.

Figure 2:
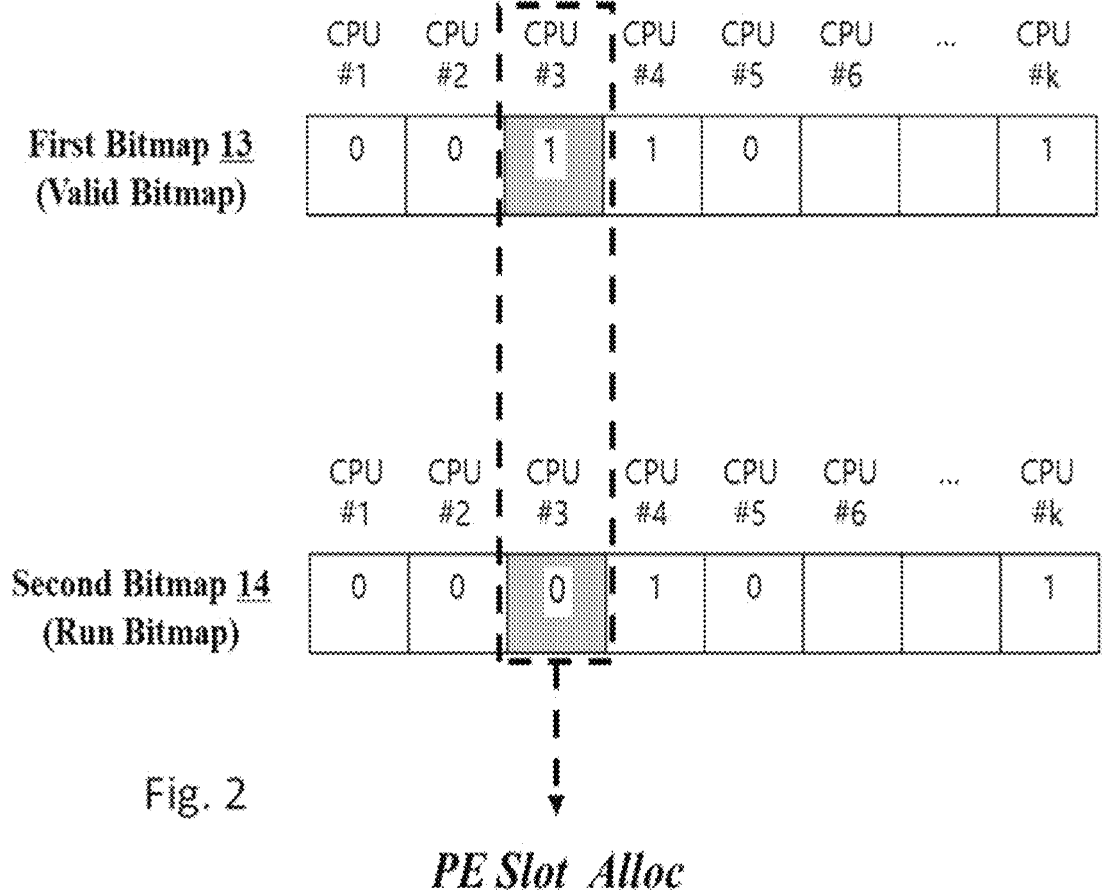
FIG. 2 is an example diagram of a first bitmap and a second bitmap used to assign commands to the programming engines in the slot management unit in accordance with one embodiment of the present disclosure.

FIG. 2 is an example diagram of the first bitmap and the second bitmap used to assign commands to the programming engines in the slot management unit in accordance with one embodiment of the present disclosure.

Referring to FIG. 2, the first bitmap 13 may enable (e.g., set to "1") the bits corresponding to the cores on which commands are currently pending. According to the example of FIG. 2, if a command is received newly from core CPU #3, the slot management unit 17 may set the bit corresponding to CPU #3 in the first bitmap 13 to "1". The bits are set to "1" for CPU #4 and CPU #k as well, and it can thus be seen that the commands received from these cores are currently pending (i.e., waiting to be executed or being executed).

The slot management unit 17 may enable (e.g., set to "1") the bits in the second bitmap 14 corresponding to the cores on which command are currently being executed. According to the example of FIG. 2, since the bit corresponding to core CPU #3 is disabled (e.g., set to "0"), it can be seen that the command from core CPU #3 is not being executed by the programming engine. On the other hand, it can be seen that the commands from CPU #4 and CPU #k are each being executed by the programming engines and have already been assigned to the programming engines.

The slot management unit 17 may identify a core CPU having a command that is currently pending and is not being executed by the programming engines based on these first bitmap 13 and second bitmap 14. Then, the identified core CPU can be allocated in sequence to an empty programming engine PE to which no commands are currently assigned (PE slot allocation). In the example of FIG. 2, as the command from core CPU #3 is currently pending (i.e., the corresponding bit in the first bitmap is enabled with "1") and is not being executed (i.e., the corresponding bit in the second bitmap is disabled with "0"), the command from core CPU #3 can be assigned to a currently empty programming engine PE. Such assignment may be made according to a round robin method via a round robin arbiter (not shown), but there are no limitations on the assignment method.

The core allocation may be suspended if there are no empty programming engines PE, and when the execution of a command in a particular programming engine is completed, the programming engine unit 20 may transmit a deallocation (PE slot release) signal for the corresponding programming engine to the slot management unit 17. Further, when the execution of a command is entirely completed, the WDMA 40 may transmit a completion signal CPL for the corresponding command to the slot management unit 17. If it is confirmed by these deallocation signal and/or completion signal that empty programming engines have occurred, the slot management unit 17 may perform the core allocation that has been suspended. The deallocation of the programming engines will be described in detail later with reference to FIG. 4.

Referring again to FIG. 1, according to one embodiment, if the slot management unit 17 has allocated a particular core (CPU #3 in the example of FIG. 2) to a programming engine PE (PE slot allocation), it can store in the mapping information 15 a mapping relationship indicating that the corresponding core has been allocated to a programming engine. In other words, the mapping information 15 can indicate a mapping relationship (correspondence relationship) between the one or more programming engines PE #1, PE #2, . . . , and PE #n of the programming engine unit 20 and the commands, more specifically, the cores that have issued the respective commands. Then, the slot management unit 17 may transmit the commands to the mapped programming engines PE of the programming engine unit 20 based on the mapping information 15.

As described above, the memory access device 1 in accordance with the present disclosure employs a method in which the slot management unit 17 in the command manager 10 allocates (i.e., maps) each core to a programming engine PE. A situation may occur in which the programming engines remain idle when the cores are not performing calculations that require the programming engines, resulting in waste of resources if there are as many programming engines PE in the programming engine unit 20 as there are cores and each core is designed to have a corresponding programming engine PE, whereas according to the present disclosure, there arise effects that the number of programming engines PE can be designed to be less than the number of cores (i.e., if the number of cores is k and the number of programming engines PE is n in FIG. 1, it is designed so that k>n) and hardware resources such as SRAM utilized for designing the programming engines can be saved. According to one embodiment, the number of programming engines may be set in advance by taking into account the amount of calculations performed on average by currently equipped cores.

Method for Allocating Cores to Programming Engines PE

Figure 3:
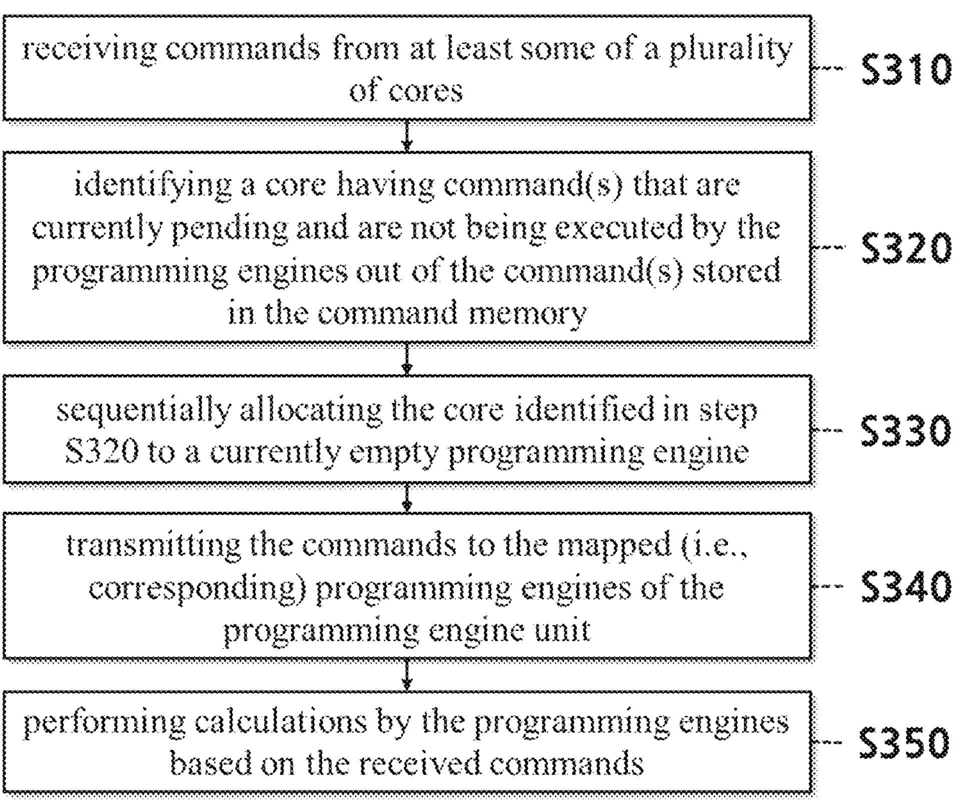
FIG. 3 is a flowchart for describing a method for allocating cores to programming engines in a slot management unit in accordance with one embodiment of the present disclosure.

FIG. 3 is a flowchart for describing a method for allocating cores to programming engines in a slot management unit in accordance with one embodiment of the present disclosure.

Referring to FIG. 3, a method 300 for allocating cores to programming engines in a slot management unit in accordance with one embodiment of the present disclosure may first receive commands from at least some of a plurality of cores in step S310. The received commands may be stored in a command memory within a command manager, and a slot management unit within the command manager may enable (e.g., set to "1") a corresponding bit in the first bitmap for indicating that the corresponding command is currently pending. In this case, the corresponding bit in the first bitmap may be the bit corresponding to the core that issued the corresponding command.

In step S320, the slot management unit in the command manager may identify core(s) having commands that are currently pending (i.e., the corresponding bits in the first bitmap are enabled with "1") and are not currently being executed by the programming engines (i.e., the corresponding bits in the second bitmap are disabled with "0") out of one or more commands stored in the command memory. The second bitmap is for identifying the core(s) having the commands that are being executed by the programming engines, and the core(s) having the commands that are being executed may have the corresponding bits in the second bitmap enabled (e.g., set to "1").

In step S330, the slot management unit may sequentially allocate the core(s) identified in step S320 to empty programming engines that are not currently executing commands. Then, the slot management unit may store in the mapping information 15 a mapping relationship indicating that a particular core has been allocated to a particular programming engine. Such sequential allocation may be made according to a round robin method via a round robin arbiter, but there are no limitations on the allocation method.

In step S340, the command manager may transmit the commands to the mapped (i.e., corresponding) programming engines of the programming engine unit based on the mapping information. At the same time, the command manager may enable (e.g., set to "1") the bit in the second bitmap corresponding to the core (e.g., a first core) that issued the corresponding command.

In step S350, the mapped programming engines may perform calculations based on the received commands. For example, a programming engine mapped to a first core of the plurality of cores may perform calculations based on a command corresponding to the first core.

For these calculations, the corresponding programming engines may receive (R-DAT) and utilize the read data from an external memory from the RDMA. Then, the result data produced as a result of the calculations may be made to be transferred (W-DAT2) to the WDMA and written to the external memory.

Meanwhile, according to one embodiment, there may be a case where the command CMD is not a single command but consists of multiple sub-commands. In this case, the processes of steps S320 to S350 above may be performed for each sub-command, and these processes may be performed according to the order of the respective sub-commands or may be performed out of order regardless of the order. If the calculations of each sub-command are performed out of order, the utilization efficiency of the programming engines can be maximized. However, after the completion of such out-of-order calculations, a process to rearrange them may be involved.

Method for Deallocating Cores from Programming Engines PE

Figure 4:
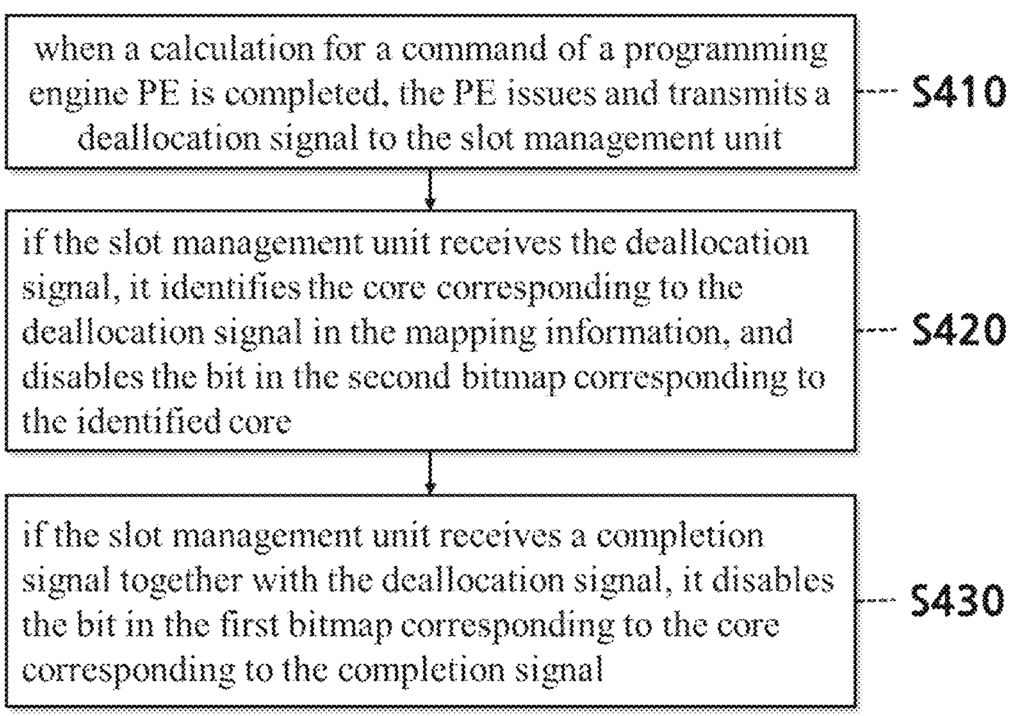
FIG. 4 is a flowchart for describing a method for deallocating cores from programming engines in accordance with one embodiment of the present disclosure.

FIG. 4 is a flowchart for describing a method for deallocating cores from programming engines in accordance with one embodiment of the present disclosure.

Referring to FIG. 4, in a method 400 for deallocating cores from programming engines in accordance with one embodiment of the present disclosure, first at step S410, when a particular calculation (or operation) of a programming engine PE corresponding to a command is completed (i.e., when step S350 is completed), the corresponding programming engine may issue and transmit a deallocation signal (PE Slot_Rel in FIG. 1) to the slot management unit of the command manager.

In step S420, if the slot management unit receives the deallocation signal PE Slot_Rel, it may identify the core corresponding to the deallocation signal in the mapping information, and disable the bit in the second bitmap corresponding to the identified core to "0".

Meanwhile, according to one embodiment, the deallocation signal PE Slot_Rel may not necessarily indicate that calculations corresponding to the commands have all been completed. For example, as described above, if a command CMD consists of multiple sub-commands, there may be a case where only the calculations corresponding to one or some of the sub-commands have been completed, while the command itself may still be pending. Therefore, the slot management unit may disable the corresponding bit in the second bitmap in response to receiving the deallocation signal, but may make no changes to the first bitmap (the valid bitmap indicating whether the command is pending).

However, according to another embodiment, the corresponding bit in the first bitmap may also be set to be disabled in response to receiving the deallocation signal, which falls within a matter that can be modified depending on the design of the overall memory access device.

In step S430, if the slot management unit receives a completion signal (CPL signal in FIG. 1) together with the deallocation signal, it may disable the bit in the first bitmap corresponding to the core corresponding to the completion signal to "0". Further, the slot management unit may transmit a signal indicating that calculation operations corresponding to the command have all been completed to the corresponding core.

Such a completion signal (CPL signal) can be transmitted by the WDMA to the slot management unit (or the command manager itself) when calculations for the command have all been completed (e.g., if the command consists of a plurality of sub-commands, calculations for all sub-commands have all been completed) and the programming engine has generated the result data and transmitted the result data to the WDMA. However, depending on the design, the completion signal CPL may be transmitted by the programming engine, but there are no limitations on this.

The methods in accordance with the present disclosure may be computer-implemented methods. In the present disclosure, each step of the methods has been shown and described in a predetermined order, but the respective steps may be performed in an order that can be arbitrarily combined in accordance with the present disclosure in addition to being performed in sequence. In one embodiment, at least some steps may be performed in parallel, iteratively, or heuristically. The present disclosure does not exclude making changes or modifications to those methods. In one embodiment, at least some steps may be omitted or other steps may be added.

The various embodiments of the present disclosure may be implemented as software recorded on a machine-readable recording medium. The software may be software for implementing the various embodiments of the present disclosure described above. The software may be inferred from the various embodiments of the present disclosure by programmers skilled in the art to which the present disclosure pertains. For example, the software may be machine-readable commands (e.g., code or code segments) or programs. The machine is a device that can operate according to instructions called from a recording medium, and may be, for example, a computer. In one embodiment, the machine may be an electronic device that includes the hardware architecture in accordance with the embodiments of the present disclosure. In one embodiment, a processor of the machine may execute a called command and cause components of the machine to perform a function corresponding to the command. A recording medium may refer to any type of recording medium in which data is stored that can be read by machines. The recording medium may include, for example, ROM, RAM, CD-ROM, a magnetic tape, a floppy disk, an optical data storage device, and the like. In one embodiment, the recording medium may be implemented in a form distributed over computer systems connected with a network, or the like. The software may be stored and executed in a distributed manner on computer systems, or the like. The recording medium may be a non-transitory recording medium. A non-transitory recording medium refers to a tangible medium regardless of whether data is stored semi-permanently or temporarily, and does not include signals that are propagated transitorily.

Although the technical idea of the present disclosure has been described above by means of various embodiments, the technical idea of the present disclosure includes various substitutions, modifications, and changes that can be made within the scope that can be understood by those having ordinary skill in the art to which the present disclosure pertains. Further, it should be understood that such substitutions, modifications and changes may fall within the scope of the appended claims. The embodiments in accordance with the present disclosure can be combined with each other. The respective embodiments can be combined in a variety of ways according to the number of cases, and embodiments created by combining them also fall within the scope of the present disclosure.

What is claimed is:

1. A multifunctional direct memory access (MDMA) device comprising:

a command memory configured to store commands from a plurality of cores;

a plurality of programming engines configured to execute the commands, wherein respective programming engines of the plurality of programming engines comprise respective internal memory and processing pipeline; and a slot management unit, wherein the slot management unit comprises at least one processor, and wherein the at least one processor is configured to:

based on corresponding values in a first bitmap and a second bitmap, identify a first core among the plurality of cores that has a command of the commands that is currently pending, wherein the first core is allocated to a first programming engine among the plurality of programming engines, the first bitmap comprising bits indicating respective cores of the plurality of cores on which a respective command of the commands is currently pending, and the second bitmap comprising corresponding bits indicating whether the respective command from the respective cores is being executed by a programming engine of the plurality of programming engines;

identify a second programming engine among the plurality of programming engines that is not executing the commands, the second programming engine being different from the first programming engine; and based on a second core having another command that is currently pending and not being executed by any of the plurality of programming engines, and the second programming engine not executing the commands, allocate the second core to the second programming engine, and wherein the second programming engine is configured to perform calculations based on the other command corresponding to the second core after the second core is allocated to the second programming engine.

2. The MDMA device of claim 1, wherein the at least one processor is set to enable bits corresponding to the respective cores of the plurality of cores on which the respective command is currently pending in the first bitmap, and disable bits corresponding to respective cores of the plurality of cores on which a respective command are not currently being executed in the second bitmap.

3. The MDMA device of claim 1, wherein allocating the first second core to the second programming engine is performed in sequence by a round-robin arbiter associated with the slot management unit.

4. The MDMA device of claim 1, wherein the at least one processor is configured to:

store a mapping relationship including that the second core has been allocated to the second programming engine, and transmit the respective command of the commands associated with the respective cores of the plurality of cores to respective programming engines of the plurality of programming engines based on the mapping relationship.

5. The MDMA device of claim 1, wherein a number of the plurality of programming engines is less than a number of the plurality of cores.

6. The MDMA device of claim 1, wherein the second programming engine is configured to issue and transmit a deallocation signal to the slot management unit subsequent to completing the calculations based on the other command corresponding to the second core, and wherein the at least one processor is configured to disable a bit in the second bitmap corresponding to the second core in response to receiving the deallocation signal.

7. The MDMA device of claim 1, wherein the second programming engine is configured to issue and transmit a deallocation signal to the slot management unit subsequent to completing the calculations based on the other command corresponding to the first second core.

8. The MDMA device of claim 7, wherein a completion signal indicating that the calculations based on the other command corresponding to the second core have all been completed is transmitted to the slot management unit, and wherein the completion signal is transmitted by WDMA (write direct memory access) after confirming that a last calculation of the second programming engine based on the other command has been completed.

9. A method for allocating a plurality of cores to a plurality of programming engines, wherein the method is performed by a multifunctional direct memory access (MDMA) device, the method comprising:

receiving and storing commands from the plurality of cores, wherein each command of the commands corresponds to a respective core of the plurality of cores;

based on corresponding values in a first bitmap and a second bitmap, identifying a first core from the plurality of cores having a command of the commands that is currently pending, wherein the first core is allocated to a first programming engine among the plurality of programming engines, the first bitmap comprising bits indicating respective cores of the plurality of cores on which a respective command of the commands is currently pending, and the second bitmap comprising corresponding bits indicating whether the respective command from the respective cores is being executed by a programming engine of the plurality of programming engines;

identifying a second programming engine among the plurality of programming engines that is not executing the commands, the second programming engine being different from the first programming engine;

based on a second core having another command that is currently pending and not being executed by any of the plurality of programming engines, and the second programming engine not executing the commands, allocating the second core to the second programming engine; and performing calculations based on the other command corresponding to the second core by the second programming engine after the second core is allocated to the second programming engine.

10. The method of claim 9, further comprising:

storing a mapping relationship including that the second core has been allocated to the second programming engine; and transmitting the respective command of the commands associated with the respective cores of the plurality of cores to respective programming engines of the plurality of programming engines based on the mapping relationship.

11. The method of claim 9, wherein a number of the plurality of programming engines is less than a number of the plurality of cores.

12. The method of claim 9, further comprising:

issuing a deallocation signal by the second programming engine that has completed calculations based on the other command corresponding to the second core; and disabling a bit in the second bitmap corresponding to the second core in response to the deallocation signal.

13. The method of claim 9, further comprising:

issuing a deallocation signal by the second programming engine that has completed the calculations based on the other command corresponding to the second core.

14. The method of claim 13, further comprising:

transmitting a completion signal indicating that the calculations based on the other command corresponding to the second core have all been completed, and wherein the completion signal is transmitted after confirming that a last calculation of the second programming engine based on the other command has been completed.

15. A non-transitory computer-readable recording medium comprising computer-executable instructions, wherein the instructions, when executed by a processor, cause a multifunctional direct memory access (MDMA) device to perform a method for allocating a plurality of cores to a plurality of programming engines, the method comprising:

receiving and storing commands from the plurality of cores, wherein each command of the commands corresponds to a respective core of the plurality of cores;

based on corresponding values in a first bitmap and a second bitmap, identifying a first core from the plurality of cores having a command of the commands that is currently pending, wherein the first core is allocated to a first programming engine among the plurality of programming engines, the first bitmap comprising bits indicating respective cores of the plurality of cores on which a respective command of the commands is currently pending, and the second bitmap comprising corresponding bits indicating whether the respective command from the respective cores is being executed by a programming engine of the plurality of programming engines;

identifying a second programming engine among the plurality of programming engines that is not executing the commands, the second programming engine being different from the first programming engine;

based on a second core having another command that is currently pending and not being executed by any of the plurality of programming engines, and the second programming engine not executing the commands, allocating the second core to the second programming engine; and performing calculations based on the other command corresponding to the second core by the second programming engine after the second core is allocated to the second programming engine.

* * * * *